United States Patent
Sugawara et al.

(10) Patent No.: US 6,667,268 B1
(45) Date of Patent: Dec. 23, 2003

(54) POLYMER ELECTROLYTE FUEL CELL HAVING A POROUS CATALYST LAYER AND A METHOD FOR MANUFACTURING THE SAME

(75) Inventors: Yasushi Sugawara, Settsu (JP); Hisaaki Gyoten, Shijonawate (JP); Makoto Uchida, Hirakata (JP); Eiichi Yasumoto, Katano (JP); Teruhisa Kanbara, Ikeda (JP); Junji Morita, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 09/648,117

(22) Filed: Aug. 25, 2000

(30) Foreign Application Priority Data

Aug. 27, 1999 (JP) ............................. 11-242132

(51) Int. Cl.[7] ............................. H01M 4/88
(52) U.S. Cl. ................... 502/101; 427/115
(58) Field of Search ............... 429/27, 40–43, 429/44, 45; 427/115; 502/101

(56) References Cited

U.S. PATENT DOCUMENTS 5,843,519 A * 12/1998 Tada .................. 427/115
5,874,182 A    2/1999 Wilkinson et al.
5,998,057 A * 12/1999 Koschany et al.
6,221,523 B1 * 4/2001 Chun et al.
6,309,772 B1 * 10/2001 Zuber et al. ............. 106/122

FOREIGN PATENT DOCUMENTS

| EP | 0 026 969 | | 4/1981 |
| EP | 0 637 851 | | 2/1995 |
| WO | WO 96/11507 | | 4/1996 |
| WO | WO 97/20359 | * | 6/1997 |
| WO | WO 99/39841 | | 8/1999 |

* cited by examiner

*Primary Examiner*—Susy Tsang-Foster
(74) *Attorney, Agent, or Firm*—McDermott, Will & Emery

(57) ABSTRACT

A polymer electrolyte fuel cell which includes a pair of electrodes, a polymer electrolyte membrane interposed between the pair of the electrodes, a first conductive separator having a channel for supplying an oxidant gas to one of the electrodes therethrough, and a second conductive separator having a channel for supplying a fuel gas to the other of the electrodes therethrough, wherein at least one of the electrodes includes a porous catalyst layer formed on the surface of the polymer electrolyte membrane, or formed on the surface of a porous conductive base.

12 Claims, 4 Drawing Sheets

POLYMER ELECTROLYTE FUEL CELL HAVING A POROUS CATALYST LAYER AND A METHOD FOR MANUFACTURING THE SAME

BACKGROUND OF THE INVENTION

The present invention relates to a polymer electrolyte fuel cell, and a method for manufacturing the same.

The electrode of a polymer electrolyte fuel cell is generally manufactured by applying a carbon powder with a noble metal carried thereon (a catalyst powder) on a porous conductive base material. Specifically, first, a catalyst powder is dispersed in an organic solvent such as isopropyl alcohol to prepare an ink. Then, the obtained ink is applied on the base material by using a screen printing method or a transfer method to form a catalyst layer. Alternatively, there is another method in which a slurry containing a catalyst powder is applied on a resin sheet by using a doctor blade method or the like, to form a sheet of the catalyst powder.

With the foregoing methods, a pore forming agent is previously added to the ink. A catalyst layer containing the pore forming agent is then formed. Thereafter, the electrode is calcined to form micropores in the catalyst layer, thereby ensuring gas diffusion within the entire electrode. Further, the water repellence of the electrode can be enhanced by allowing the ink to contain a carbon powder with polytetrafluoroethylene (PTFE) carried thereon.

The electrode thus manufactured is joined to a polymer electrolyte membrane by hot pressing or the like, resulting in a membrane electrode assembly (MEA).

As described above, a process for removing the pore forming agent from the catalyst layer is required in obtaining an electrode by conventional methods. Specifically, a process of calcining or washing the electrode is required. Therefore, the conventional process of manufacturing the electrode is complicated.

Further, it is considered that a catalyst layer is preferably formed by directly applying the catalyst powder to the polymer electrolyte membrane from the viewpoint of an increase in electrode reaction area.

However, it is very difficult to form a catalyst layer directly on the polymer electrolyte membrane by a printing method or the like, from the viewpoints of swelling property of the polymer electrolyte membrane and difficulty in the fixation of the polymer electrolyte membrane to the printing machine.

BRIEF SUMMARY OF THE INVENTION

The present invention relates to a polymer electrolyte fuel cell comprising a pair of electrodes, a polymer electrolyte membrane interposed between the pair of the electrodes, a first conductive separator having a channel for supplying an oxidant gas to one of the electrodes therethrough, and a second conductive separator having a channel for supplying a fuel gas to the other of the electrodes therethrough, wherein at least one of the electrodes comprises a porous conductive base material and a porous catalyst layer formed on a surface of the polymer electrolyte membrane. The first or second separator includes a separator having a channel for supplying an oxidant gas to one of a pair of electrodes on one side and a channel for supplying a fuel gas to one of other pair of electrodes on the other side.

The porous catalyst layer is preferably formed by spraying an ink containing a catalyst powder dispersed therein onto a surface of the polymer electrolyte membrane.

The catalyst powder herein denotes, for example, a carbon powder with a noble metal carried thereon.

Further, the present invention relates to a polymer electrolyte fuel cell comprising a pair of electrodes, a polymer electrolyte membrane interposed between the pair of the electrodes, a first conductive separator having a channel for supplying an oxidant gas to one of the electrodes therethrough, and a second conductive separator having a channel for supplying a fuel gas to the other of the electrodes therethrough, wherein at least one of the electrodes comprises a porous conductive base material and a porous catalyst layer formed on a surface of the porous conductive base material, the porous catalyst layer facing the polymer electrolyte membrane.

The porous catalyst layer is preferably formed by spraying an ink containing a catalyst powder dispersed therein onto a surface of the porous conductive base material.

Further, the present invention relates to a method for manufacturing a polymer electrolyte fuel cell comprising a step of obtaining an electrode by forming a porous catalyst layer by spraying an ink containing a catalyst powder dispersed therein onto a surface of a polymer electrolyte membrane or a porous conductive base material.

The ink is preferably the one containing a carbon powder with a noble metal carried thereon, the one containing a carbon powder with a noble metal carried thereon and a polymer electrolyte, or the one containing a carbon powder with a noble metal carried thereon, a polymer electrolyte, and a water repellent-treated carbon powder. The water repellent treatment may be conducted by using a fluorocarbon resin such as polytetrafluoroethylene (PTFE) or the like.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
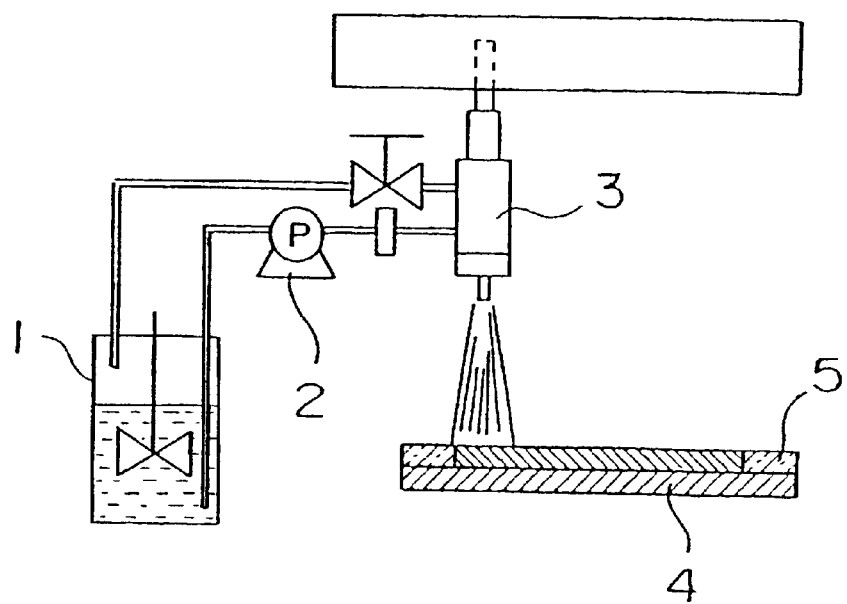
FIG. 1 is a view showing one example of a spray applying apparatus for use in manufacturing an electrode for a polymer electrolyte fuel cell in accordance with the present invention.

A polymer electrolyte fuel cell of the present invention is characterized by the electrode. Namely, the polymer electrolyte fuel cell of the present invention includes an electrode comprising a porous catalyst layer formed on the surface of a polymer electrolyte membrane, or an electrode comprising a porous catalyst layer formed on a surface of a porous conductive base material, the porous catalyst layer facing the polymer electrolyte membrane.

The porous catalyst layer of the electrode of the present invention has more micropores than the catalyst layer of the electrode of a conventional polymer electrolyte fuel cell. Therefore, the electrode reaction area in the electrode of the present invention is larger than that in a conventional one, thereby facilitating the gas diffusion. The preferred mean diameter of the micropore is in the range of 0.04 to 1 $\mu$m. Whereas, the specific volume of the porous catalyst layer is preferably 0.04 cm$^3$/g or more, and more preferably 0.06 cm$^3$/g or more.

The porous catalyst layer can be formed by atomizing an ink containing a catalyst powder dispersed therein, and directly spraying it onto a surface of the polymer electrolyte membrane or the porous conductive base material. In this case, the ink is preferably atomized to fine particles, the particle having a mean particle size of 10 to 50 $\mu$m, and allowed to adhere onto the surface of an adherend, i.e. the surface to be adhered.

As the preferred method for obtaining the porous catalyst layer, a spray applying method can be exemplified in which the ink is sprayed onto the surface of the polymer electrolyte membrane or the porous conductive base material. The spray application may be conducted by spraying an ink containing a catalyst powder dispersed therein from a spray nozzle with an arbitrary pressure. The sprayed ink is atomized, and most of the solvent therein is vaporized before the atomized ink is adhered onto the surface of the polymer electrolyte membrane or the porous conductive base material. Therefore, the porous catalyst layer is formed in such a manner that the catalyst powder is deposited on the adherend. Further, in the spray application, the polymer electrolyte membrane is hardly swelled with the solvent. Accordingly, it is possible to form the porous catalyst layer directly on the surface of the polymer electrolyte membrane, and hence the adhesion between the polymer electrolyte membrane and the porous catalyst layer is enhanced.

The conditions for the spray application differ depending on the type of the solvent and the like. For example, the preferred nozzle diameter is in the range of 0.5 to 2 mm; the preferred spraying pressure from the nozzle is in the range of 0.5 to 3 kgf/cm$^2$; and the preferred distance between the adherend and the nozzle is in the range of 5 to 30 cm.

In the ink for use in the spray application, several catalyst powder particles, the polymer electrolyte and the like are tangled with each other to form a secondary particle. The preferred mean particle size of the secondary particle is in the range of 1 to 10 $\mu$m.

The preferred catalyst powder is, for example, a carbon powder with a noble metal carried thereon. The mean particle size of the carbon powder may be, for example, in the range of 100 to 1000 nm. The ink may further contain a polymer electrolyte, a carbon powder, which was subjected to a water repellent treatment with a fluorocarbon resin, a water repellent agent and the like, in addition to the catalyst powder. As the water repellent agent herein, a fluorocarbon resin such as PTFE is preferably used.

Further, the preferred content of the catalyst powder in the ink is in the range of 1 to 7% by weight. Still further, the preferred content of the solid component in the ink is in the range of 5 to 20% by weight. Furthermore, the preferred viscosity of the ink is 50 P or less.

Preferred examples of the solvent for the ink include butanol, ethoxyethanol, pentyl alcohol, and butylacetate. These may be used singly, or in combination of two or more thereof. Among them, butanol and butylacetate are particularly preferred in terms of easiness in vaporization due to spraying.

Preferred examples of the polymer electrolyte membrane include a membrane comprising perfluorocarbonsulfonic acid represented by a Nafion membrane (for example, Nafion 112) manufactured by Du Pont Co.

As the porous conductive base material, there are preferably used carbon paper, carbon cloth, a carbon-PTFE composite sheet (the base material obtained by kneading a carbon and PTFE, and forming the kneaded mixture into a sheet).

As the conductive separator to be used in the present invention, the commonly and conventionally used one capable of supplying a gas to the electrode along the surface thereof can be used without particular limitation. Further, there is no particular limitation on the shape of the polymer electrolyte fuel cell obtained by laminating the MEA and the separator or the like.

Then, the present invention will be described concretely by way of the following examples.

EXAMPLE 1

An ink containing 20 g of a catalyst powder comprising 75 parts by weight of a carbon powder (particle size: 100 to 500 nm) and 25 parts by weight of platinum carried on the carbon powder, 225 g of a Nafion dispersion (resin component: 5% by weight, manufactured by U.S. Aldrich Co.), 250 g of butanol as a solvent, and several drops of a commercially available surfactant (NP-10, manufactured by NIHON SURFACTANT KOGYO K.K.) was prepared. The preparation was accomplished by a ball mill method.

The obtained ink was sprayed onto the both surfaces of the Nafion membrane (Nafion 112 manufactured by Du Pont Co.), i.e., a polymer electrolyte membrane, by using a spray applying apparatus as shown by FIG. 1 to form a porous catalyst layer.

In the spray applying apparatus, the nozzle diameter was set at 0.5 to 2 mm, the spraying pressure from the nozzle was set at 0.5 to 3 kgf/cm$^2$, and the distance between the adherend and the nozzle was set at 5 to 30 cm in order to atomize the ink to fine particles with a mean particle size of 10 to 50 $\mu$m.

In concrete, as shown in FIG. 1, an ink was charged in a container 1, and constantly stirred by a stirring blade. The ink in the container 1 was introduced into a spray nozzle 3 by a pump 2. The ink which was not sprayed from the spray nozzle 3 was circulated and recovered into the container 1. The spray nozzle 3 can be scanned two-dimensionally at an arbitrary speed by two actuators. A frame 5 having an aperture of 60 mm×60 mm square, for masking, was placed on a polymer electrolyte membrane 4, over which the spray nozzle 3 moved while spraying the ink thereon.

On the other hand, a carbon paper having a thickness of 360 $\mu$m (manufactured by Toray Industries, Inc.) cut to the same size as the obtained porous catalyst layer was prepared. Then, a water repellent treatment was carried out by immersing the carbon paper into a dispersion of PTFE (ND-1 manufactured by DAIKIN INDUSTRIES, Ltd.), and then calcining the carbon paper.

Figure 2:
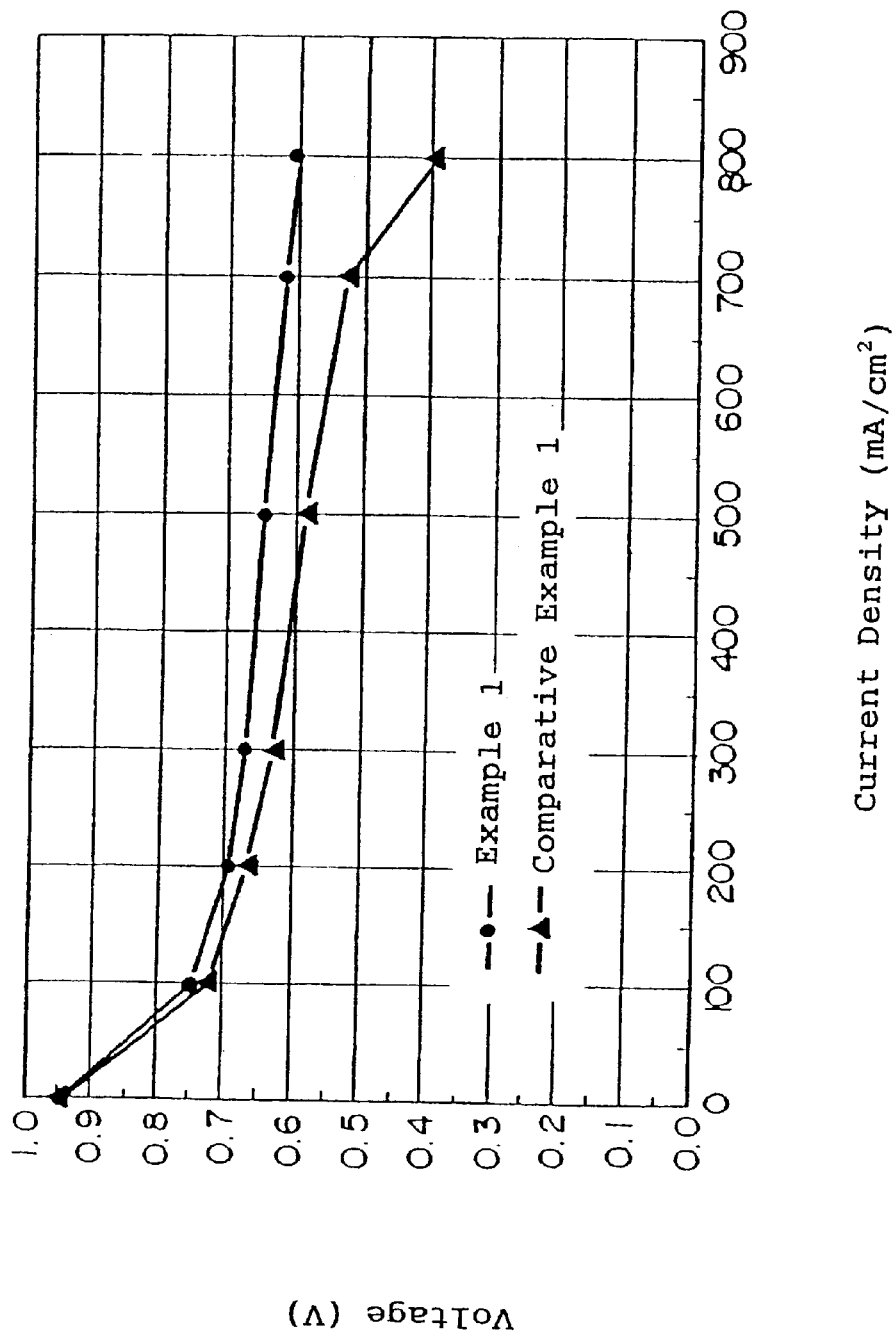
FIG. 2 is a graph showing the current-voltage characteristics of unit cells manufactured in Example 1 and Comparative Example 1, respectively.

Subsequently, the polymer electrolyte membrane with porous catalyst layers formed on both sides was interposed between two pieces of the carbon paper after the water repellent treatment. The MEA thus obtained was assembled to a unit cell and polarization characteristics of it was measured. Then, a hydrogen gas and air were supplied to the anode and cathode of the unit cell, respectively. Further, the cell temperature was set at 80° C., the ratio of fuel utilization was set at 90%, and the ratio of air utilization was set at 30%. Further, the gases were humidified so that the hydrogen gas had a dew point of 75° C., and air had a dew point of 65° C. The current-voltage characteristics of the obtained cell is shown in FIG. 2.

Comparative Example 1

A catalyst layer was formed by using a conventionally and commonly employed screen printing method with the same ink as in Example 1. However, when the screen printing method is employed, it is difficult to print the ink on the surface of the polymer electrolyte membrane. For this reason, the ink was screen printed on the same carbon paper, which had been subjected to the water repellent treatment, as in Example 1 in a conventional manner. At this step, a 100-mesh screen was used. The electrode thus obtained was sufficiently dried at 80° C. to remove the solvent therefrom, and then the polymer electrolyte membrane was interposed between two electrodes. Then, the same unit cell was assembled as in Example 1 to perform the same operation. The current-voltage characteristics of the obtained cell is shown in FIG. 2.

EXAMPLE 2

The same procedure as in Example 1 was conducted, except that the ink was sprayed onto surfaces of two carbon papers which had been subjected to a water repellent treatment in place of the polymer electrolyte membrane to form a porous catalyst layer. Then a MEA was obtained by interposing the same polymer electrolyte membrane as Example 1 between the two carbon papers with the formed catalyst layer facing inside. The current-voltage characteristics of the obtained cell is shown together with the result of Comparative Example 1 in FIG. 3.

Figure 3:
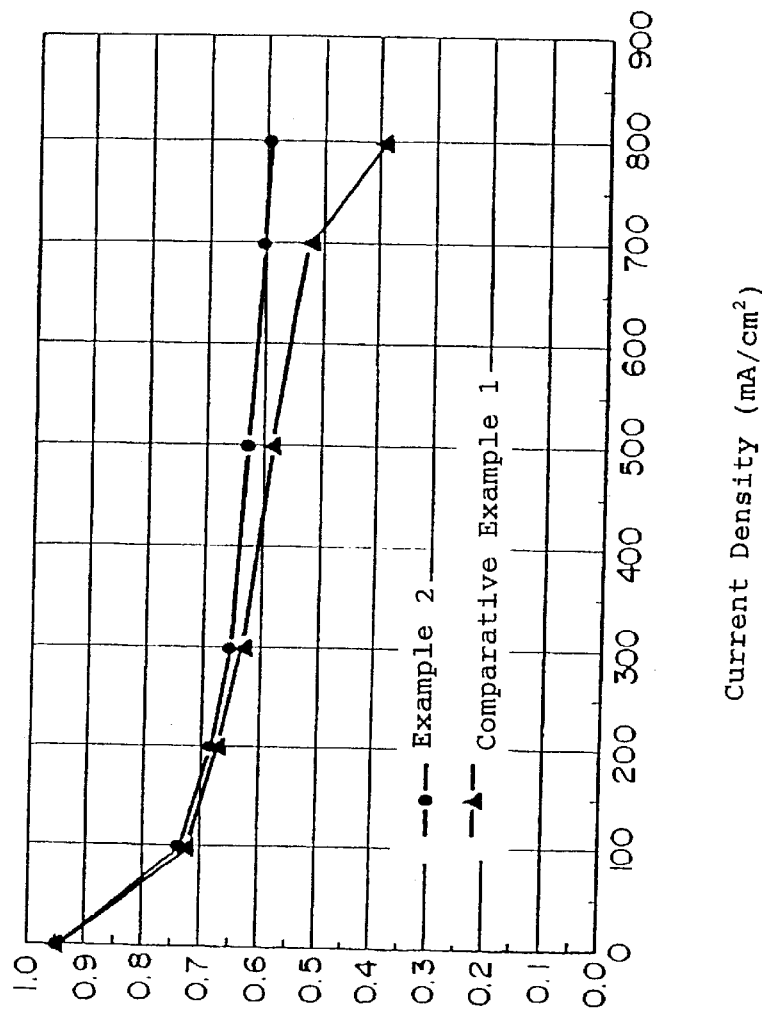
FIG. 3 is a graph showing the current-voltage characteristics of unit cells manufactured in Example 2 and Comparative Example 1, respectively.

FIGS. 2 and 3 indicate that the unit cell including the porous catalyst layer in accordance with the present invention is more excellent in the characteristics than the unit cell using the electrode manufactured by the screen printing method.

Then, the cross section of the electrode obtained in Example 2 and the cross section of the electrode obtained in Comparative Example 1 were observed by a scanning electron microscope (SEM). As a result, it was observed that micropores facilitating the gas diffusion were formed throughout the whole catalyst layer in the former electrode. On the other hand, it was observed that the catalyst layer was closely formed on the carbon paper, the number of the micropores was small, and the micropores were not uniformly formed throughout the whole catalyst layer in the latter electrode.

Figure 4:
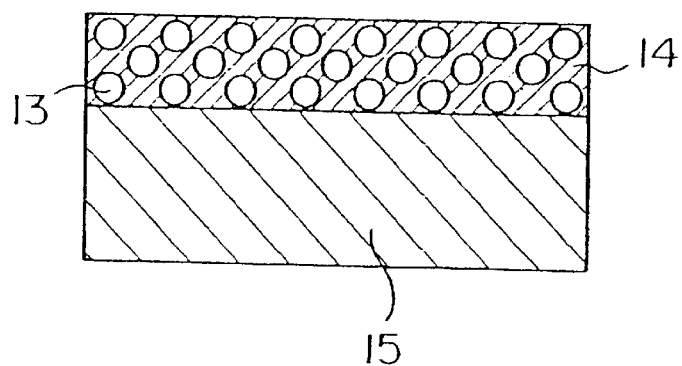
FIG. 4 is a schematic cross sectional view of a porous catalyst layer formed on carbon paper by a spray application.
Figure 5:
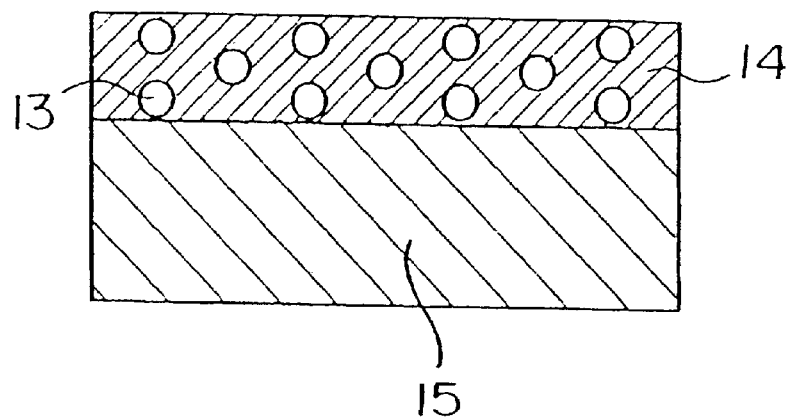
FIG. 5 is a schematic cross sectional view of a porous catalyst layer formed on carbon paper by a screen printing method.

FIG. 4 shows a schematic cross sectional view of the porous catalyst layer formed on the carbon paper by the spray application. Whereas, FIG. 5 shows a schematic cross sectional view of the catalyst layer formed on the carbon paper by a screen printing method. In FIGS. 4 and 5, a numeral 13 denotes a micropore, a numeral 14 denotes a catalyst layer, and a numeral 15 denotes a carbon paper.

When an electrode is manufactured by the spray application, as shown in FIG. 4, a large number of the micropores 13 facilitating the gas diffusion are formed throughout the whole catalyst layer. When a large number of micropores are present in the catalyst layer, the electrode reaction area is enlarged, thereby facilitating the gas diffusion. Therefore, such a structure is most suitable for an electrode.

Further, when the ink containing a catalyst powder is sprayed onto the surface of the polymer electrolyte membrane or the porous conductive base material, most of the solvent in the ink is vaporized prior to adhesion of the ink onto the surface of the polymer electrolyte membrane or the porous conductive base material. Therefore, the ink is applied on, or rather adheres to the surface of the polymer electrolyte membrane or the porous conductive base material in such a manner that the catalyst powder is deposited thereon. The porous catalyst layer thus formed enables to produce an electrode having higher gas diffusion rate. Further, in the spray application, since most of the solvent in the ink is vaporized, the polymer electrolyte membrane is not swelled with the solvent. Accordingly, the adhesion between the polymer electrolyte membrane and the porous catalyst layer is enhanced.

On the other hand, when the electrode is formed by using the screen printing method, as shown in FIG. 5, the catalyst layer is closely formed on the carbon paper, and hence the number of the micropores 13 is decreased.

These indicate that the electrode formed by spraying the ink containing the catalyst powder dispersed therein onto the surface of the polymer electrolyte membrane or the carbon paper is more excellent in structure as well as performances as compared with the electrode manufactured by the conventional screen printing method.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for manufacturing a polymer electrolyte fuel cell comprising a step of obtaining an electrode by forming a porous catalyst layer having micropores in the range of 0.04 to 1 μm in mean diameter and having specific volume of 0.04 cm³/g or more by atomizing an ink containing a catalyst powder dispersed therein onto a surface of a polymer electrolyte membrane or a porous conductive base material, wherein the distance between an end of the nozzle from which said ink is discharged and the surface on which said ink is deposited is in the range of 5 to 30 cm.

2. The method for manufacturing a polymer electrolyte fuel cell in accordance with claim 1, wherein said ink contains a catalyst powder; a catalyst powder and a polymer electrolyte; or a catalyst powder, a polymer electrolyte, and a water repellent-treated carbon powder.

3. The method of manufacturing a polymer electrolyte fuel cell according to claim 1, wherein said ink is sprayed utilizing a nozzle having a diameter in the range of 0.5 to 2.0 mm.

4. The method of manufacturing a polymer electrolyte fuel cell according to claim 1, wherein a solvent for dispersing the catalyst powder is substantially vaporized before the catalyst powder adheres to the surface.

5. The method of manufacturing a polymer electrolyte fuel cell according to claim 4, wherein the solvent is butanol or butylacetate.

6. The method of manufacturing a polymer electrolyte fuel cell according to claim 1, wherein the atomized ink has a mean particle size of 10 to 50 μm.

7. A method for manufacturing a polymer electrolyte fuel cell comprising a step of obtaining an electrode by forming a porous catalyst layer having micropores in the range of 0.04 to 1 μm in mean diameter and having specific volume of 0.04 cm$^3$/g or more by atomizing an ink containing a catalyst powder dispersed therein onto a surface of a polymer electrolyte membrane or a porous conductive base material, wherein a solvent for dispersing the catalyst powder is substantially vaporized before the catalyst powder adheres to the surface.

8. The method for manufacturing a polymer electrolyte fuel cell in accordance with claim 7, wherein said ink contains a catalyst powder; a catalyst powder and a polymer electrolyte; or a catalyst powder, a polymer electrolyte, and a water repellent-treated carbon powder.

9. The method of manufacturing a polymer electrolyte fuel cell according to claim 7, wherein said ink is sprayed utilizing a nozzle having a diameter in the range of 0.5 to 2.0 mm.

10. The method of manufacturing a polymer electrolyte fuel cell according to claim 9, wherein the distance between an end of the nozzle from which said ink is discharged and the surface on which said ink is deposited is in the range of 5 to 30 cm.

11. The method of manufacturing a polymer electrolyte fuel cell according to claim 7, wherein the solvent is butanol or butylacetate.

12. The method of manufacturing a polymer electrolyte fuel cell according to claim 7, wherein the atomized ink has a mean particle size of 10 to 50 μm.

* * * * *